(12) United States Patent
Stout et al.

(10) Patent No.: US 8,006,828 B2
(45) Date of Patent: Aug. 30, 2011

(54) RECIPROCATING SLAT CONVEYOR WITH MOVING SLATS BETWEEN FIXED SLATS

(75) Inventors: Kenneth A. Stout, Madras, OR (US);
Robert Moore, Madras, OR (US);
James P. Drago, Metolius, OR (US);
Michael Kloepfer, Delhi (CA)

(73) Assignee: Keith Manufacturing Co., Madras, OR (US)

( * ) Notice: Subject to any disclaimer, the term of this patent is extended or adjusted under 35 U.S.C. 154(b) by 0 days.

(21) Appl. No.: 12/221,295

(22) Filed: Aug. 1, 2008

(65) Prior Publication Data

US 2010/0025194 A1 Feb. 4, 2010

(51) Int. Cl.
*B65G 25/04* (2006.01)
(52) U.S. Cl. ................ 198/750.4; 198/750.2; 414/525.1
(58) Field of Classification Search ............... 198/750.2, 198/750.3, 750.4; 414/525.1, 525.9
See application file for complete search history.

(56) References Cited

U.S. PATENT DOCUMENTS

| | | | | |
|---|---|---|---|---|
| 4,856,645 A * | 8/1989 | Hallstrom, Jr. | ............ | 198/750.4 |
| 5,044,870 A * | 9/1991 | Foster | ............ | 414/809 |
| 5,088,595 A * | 2/1992 | Hallstrom, Jr. | ............ | 198/750.3 |
| 5,350,054 A * | 9/1994 | Foster | ............ | 198/750.5 |
| 5,419,426 A * | 5/1995 | Foster | ............ | 198/750.4 |
| RE35,022 E * | 8/1995 | Foster | ............ | 198/750.5 |
| 5,482,155 A * | 1/1996 | Foster | ............ | 198/750.2 |
| 6,409,009 B1 * | 6/2002 | Foster | ............ | 198/750.2 |
| 6,575,293 B2 * | 6/2003 | Foster | ............ | 198/750.2 |
| 6,782,994 B1 * | 8/2004 | Foster | ............ | 198/750.2 |
| 6,848,569 B1 * | 2/2005 | Foster | ............ | 198/750.2 |
| 6,889,819 B1 * | 5/2005 | Foster | ............ | 198/750.3 |
| 7,243,779 B2 * | 7/2007 | Foster | ............ | 198/750.2 |
| 7,374,034 B2 * | 5/2008 | Foster | ............ | 198/750.3 |
| 7,556,141 B2 * | 7/2009 | Foster et al. | ............ | 198/750.2 |

* cited by examiner

*Primary Examiner* — Joseph A Dillon, Jr.
(74) *Attorney, Agent, or Firm* — Bruce A. Kaser

(57) ABSTRACT

Movable conveyor slats (10, 10') have side parts (14, 14', 16, 16') which rest on top parts (94) of bearings (92). The bearings (92) have a generally U-shaped cross section and they fit on wings (72, 74) which extend outwardly and upwardly from the sides of a fixed conveyor slat (12). The movable slats (10, 10') have a web (22, 24) and lower flange portions (26, 28) which with the side parts (14, 16) form laterally outwardly opening channels. The wings (72, 74) and the bearings (92) are received within the channel spaces.

4 Claims, 14 Drawing Sheets

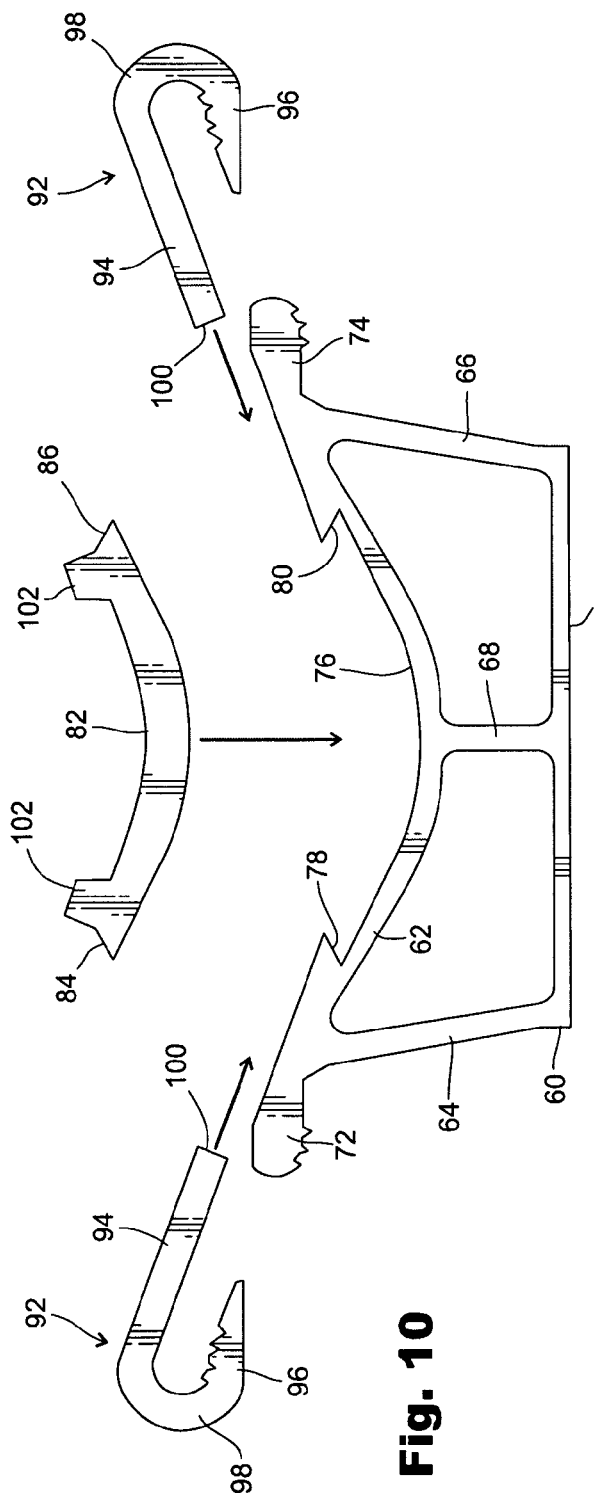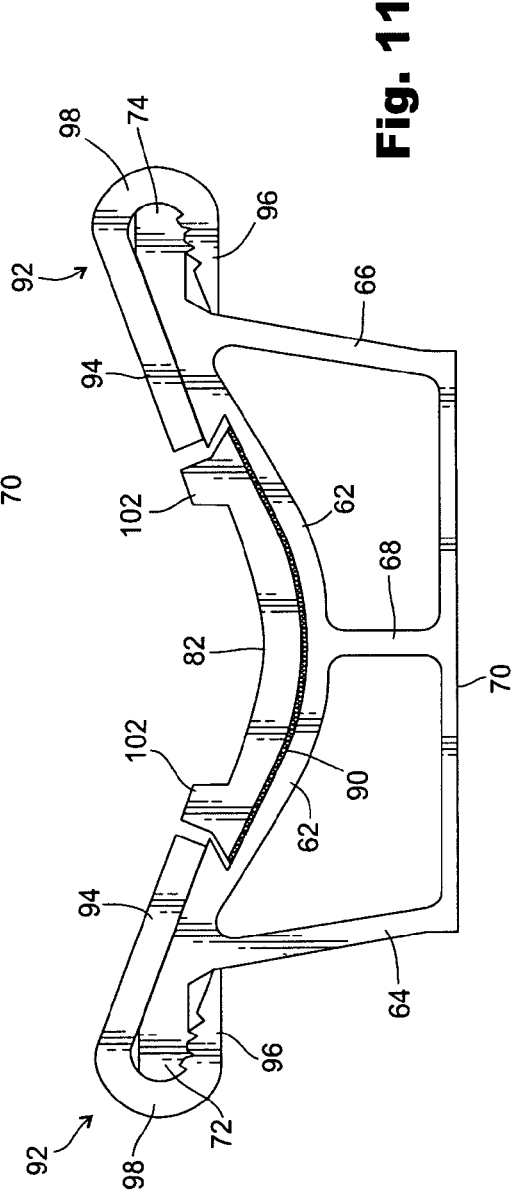

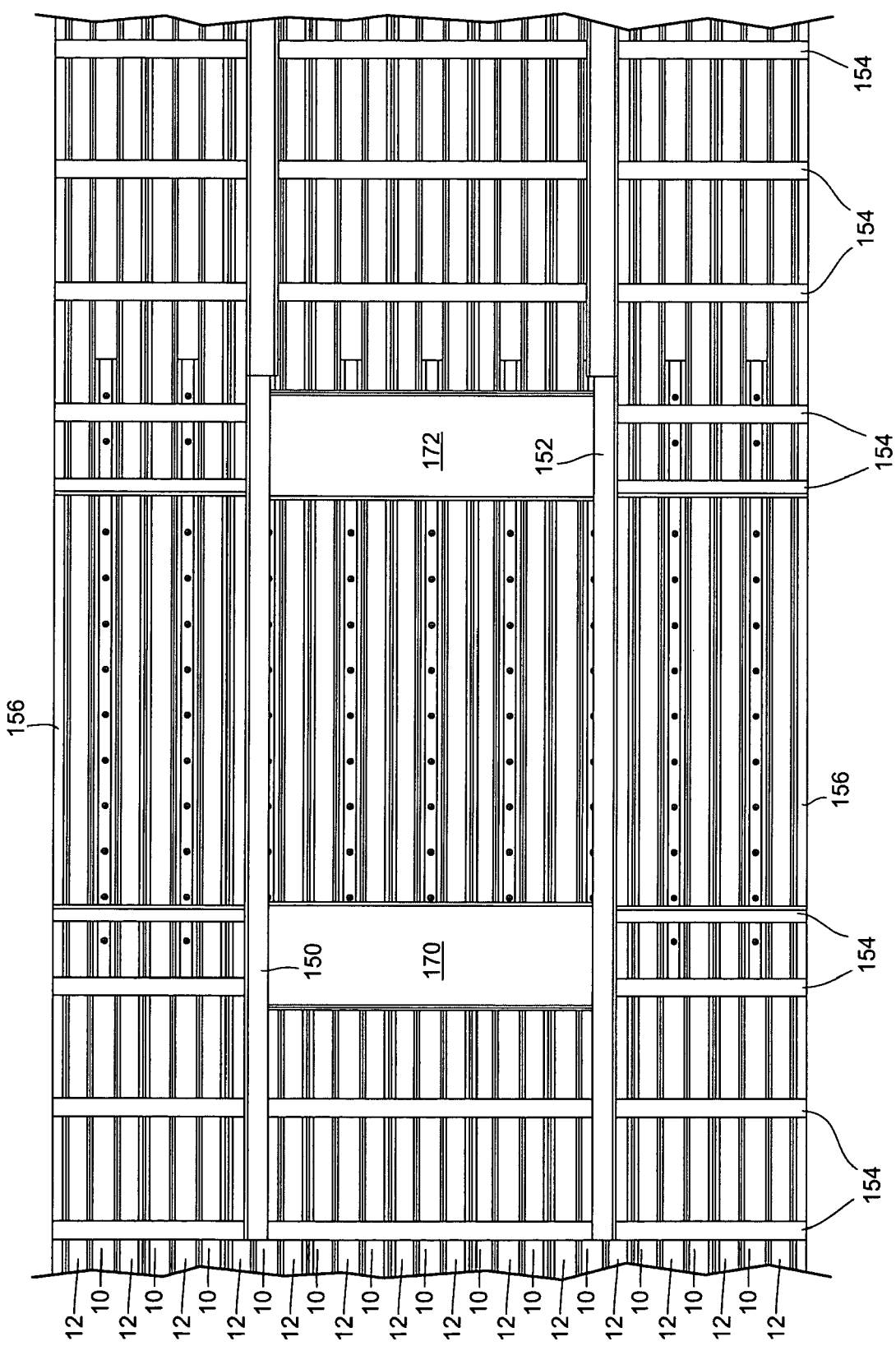

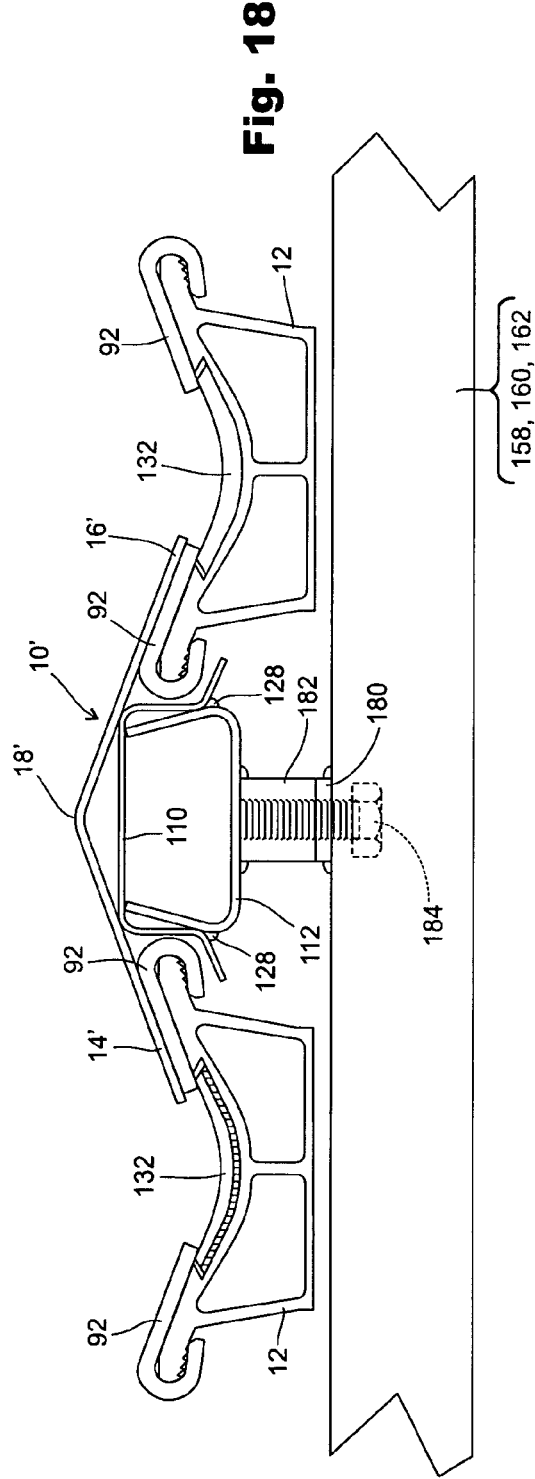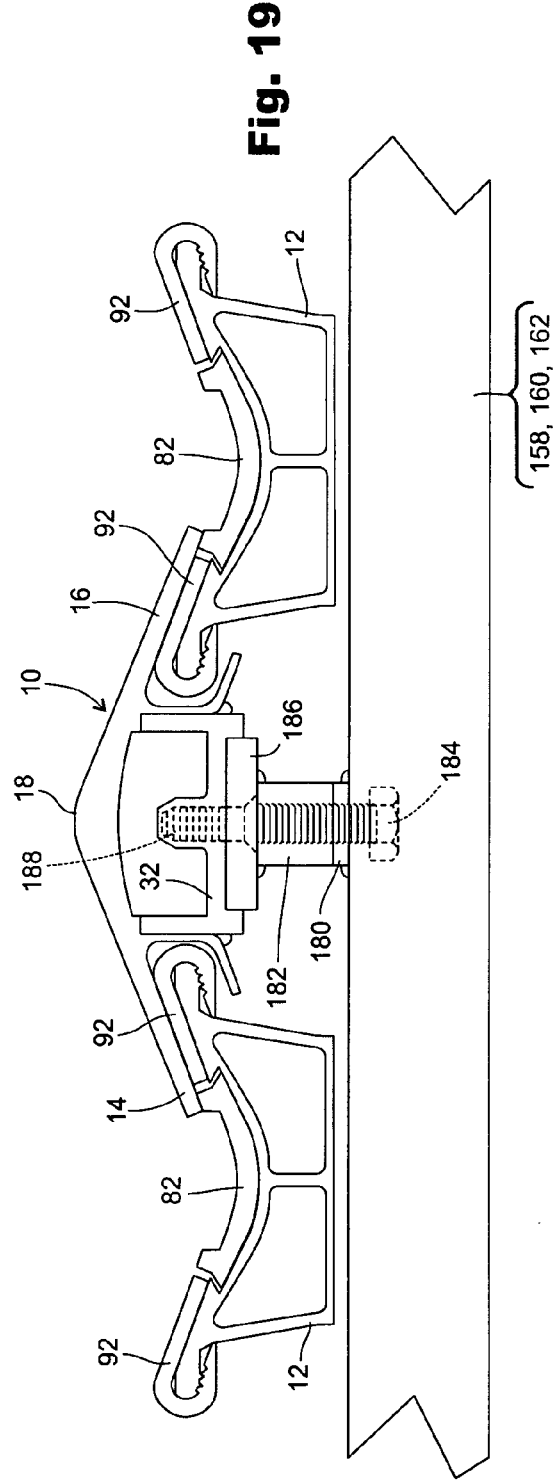

RECIPROCATING SLAT CONVEYOR WITH MOVING SLATS BETWEEN FIXED SLATS

TECHNICAL FIELD

This invention relates to reciprocating slat conveyors. More particularly, it relates to reciprocating slat conveyors comprising laterally spaced apart fixed conveyor slats and laterally spaced apart movable conveyor slats located between the fixed conveyor slats, and to a bearing system for mounting the movable conveyor slats for longitudinal movement on the fixed conveyor slats. It also relates to wear plates connectable to upper central portions of the fixed conveyor slats and to arrangements of these wear plates which protect bearing members that are vertically between the fixed and movable conveyor slats from being contacted and injured by conveyed objects.

BACKGROUND OF THE INVENTION

U.S. Pat. No. Re35,022, granted Aug. 22, 1995, to Raymond Keith Foster, and entitled Reduced Size Drive-Frame Assembly For A Reciprocating Slat Conveyor, discloses a reciprocating slat conveyor in which the conveyor slats are connected to transverse drive beams which are in turn connected to linear hydraulic motors. The linear hydraulic motors move the drive beams and the drive beams move the conveyor slats that are connected to them.

U.S. Pat. No. 5,350,054, granted Sep. 27, 1994, to Raymond Keith Foster, and entitled Ball Block For Mounting Linear Motor, discloses a reciprocating slat conveyor in which the transverse drive beams are physically separated from the linear hydraulic motors. The linear hydraulic motors are connected to selected conveyor slats that are directly driven by the linear hydraulic motors. The driven conveyor slats are connected to the remaining conveyor slats by the transverse drive beams.

U.S. Pat. No. 6,409,009, granted Jun. 25, 2002, to Raymond Keith Foster, and entitled Conveyor Slat And Connection Method, and U.S. Pat. No. 6,575,293, granted Jun. 10, 2003, to Raymond Keith Foster, each discloses apparatus for connecting conveyor slats to transverse drive beams.

U.S. Pat. No. 5,044,870, granted Sep. 3, 1999, to Raymond Keith Foster, and entitled Method For Collecting And Compacting Garbage And Then Loading It Into A Road Vehicle, discloses a reciprocating slat conveyor composed of laterally spaced apart moving conveying slats and laterally spaced apart fixed conveyor slats that are located between the movable conveyor slats.

U.S. patent application Ser. No. 11/330,614, filed Jan. 12, 2006, by Raymond Keith Foster, and entitled Reciprocating Slat Conveyor With Bearing Planks On Fixed Slats Between Moving Slats relates to bearing members carried by the fixed slats on which the moving conveyor slats are supported for longitudinal movement.

The present invention provides an improvement on the conveyor that is disclosed by U.S. Pat. No. 5,044,870. The improvement includes the use of some technology disclosed in the above-identified U.S. Pat. Nos. 5,350,054; 6,409,009; 6,575,293; Re35,022 and/or in pending U.S. application Ser. No. 11/330,614. The contents of U.S. Pat. No. 5,044,870 are incorporated herein by this specific reference.

BRIEF SUMMARY OF THE INVENTION

The present invention provides an improved conveyor slat for a reciprocating slat conveyor. The conveyor slat comprises an elongated slat body having a top wall, spaced apart webs depending from the top wall, and lower flanges projecting laterally outwardly from connections with the webs. The top wall has opposite side parts which project laterally outwardly beyond the webs and a center part which is between the webs and the side parts. The side parts of the top slope downwardly as they extend outwardly beyond the webs. The lower flanges slope downwardly as they extend outwardly beyond the webs. The side parts of the top wall, the webs and the flanges together form laterally outwardly opening channels.

In some embodiments, the center part of the top wall has a convex crown. Each web forms an acute angle with the side part of the top wall on its side of the slat and an obtuse angle with the lower flange on its side of the slat body. The center part of the top wall may be generally flat and is thicker than the side parts of the top wall.

In one embodiment, the slat has an aluminum top member which includes the top wall, the webs and the lower flanges. It also has an elongated aluminum bottom member which fits between the webs and is welded to the top member. The bottom member may have opposite side walls and an interconnecting bottom wall. The bottom wall may include a longitudinal rib on its upper side that is provided with a plurality of longitudinally spaced apart internally threaded bolt-receiving openings. A steel bar is provided below the bottom member of the slat. Bolts extend through the steel bar and thread into the threaded bolt openings and connect the steel bar to the aluminum lower member. The steel bar is welded to a steel pedestal that sits down onto one of the transverse drive beams which moves the conveyor slats.

In another embodiment of the invention, the conveyor slat and an intermediate member below the conveyor slat are constructed from steel and are connected together. When connected together, the two steel members provide laterally outwardly opening side channels having upper and lower flanges. A lower steel member below the intermediate steel member is welded to the intermediate steel member. The intermediate and lower steel members are welded to a steel mounting pedestal. The mounting pedestal is connected by bolts to a transverse drive beam.

Other objects, advantages and features of the invention will become apparent from the description set forth below, from the drawings and from the principles that are embodied in the specific structures that are illustrated and described.

BRIEF DESCRIPTION OF THE SEVERAL VIEWS OF THE DRAWINGS

Like reference numerals are used to designate like parts throughout the several views of the drawing, and:

FIG. 10 is an exploded end view of the fixed conveyor slat and the bearings that are carried by the fixed conveyor slat;

FIG. 11 is an end view of an assembled fixed conveyor slat, looking towards the end where at the insert member is welded to the base member;

FIG. 17 is a view like FIG. 16, but with the transverse drive beams and drive units omitted;

FIG. 18 is a view like FIG. 5, showing structure for connecting the movable slats to the transverse drive beams;

FIG. 19 is a view like FIG. 18, but of the embodiment shown by FIG. 12;

DETAILED DESCRIPTION OF THE ILLUSTRATED EMBODIMENT

The aforementioned U.S. Pat. No. 6,848,569 discloses a reciprocating slat conveyor within a container that receives bulk material. The conveyor extends substantially the full length of the container. An embodiment of the conveyor is disclosed herein. It includes movable slats 10 that are laterally spaced apart and fixed conveyor slats 12 that are laterally spaced apart and are positioned between the movable slats 10.

Figure 6:
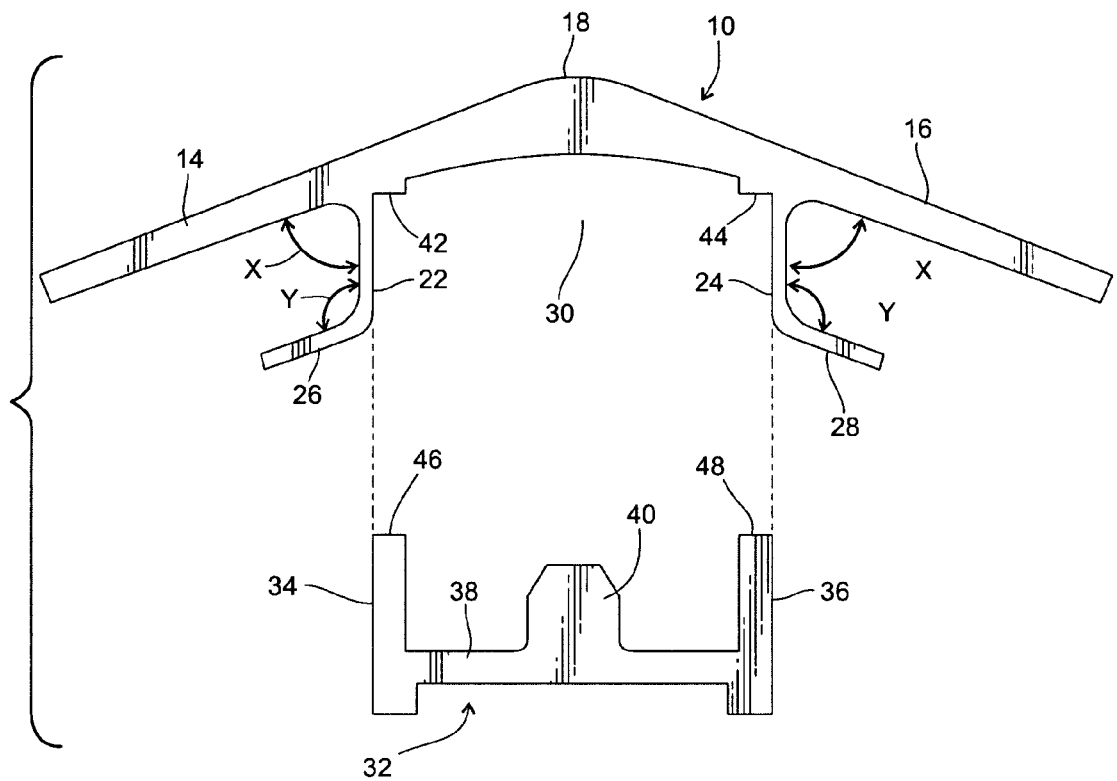
FIG. 6 is an exploded end view of the moving conveyor slat.
Figure 7:
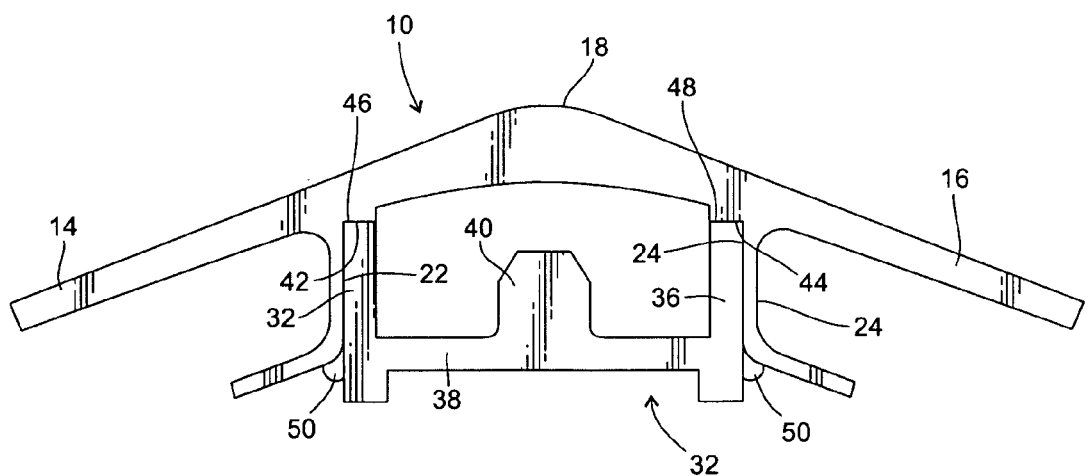
FIG. 7 is an assembled end view of the moving conveyor slat.
Figure 8:
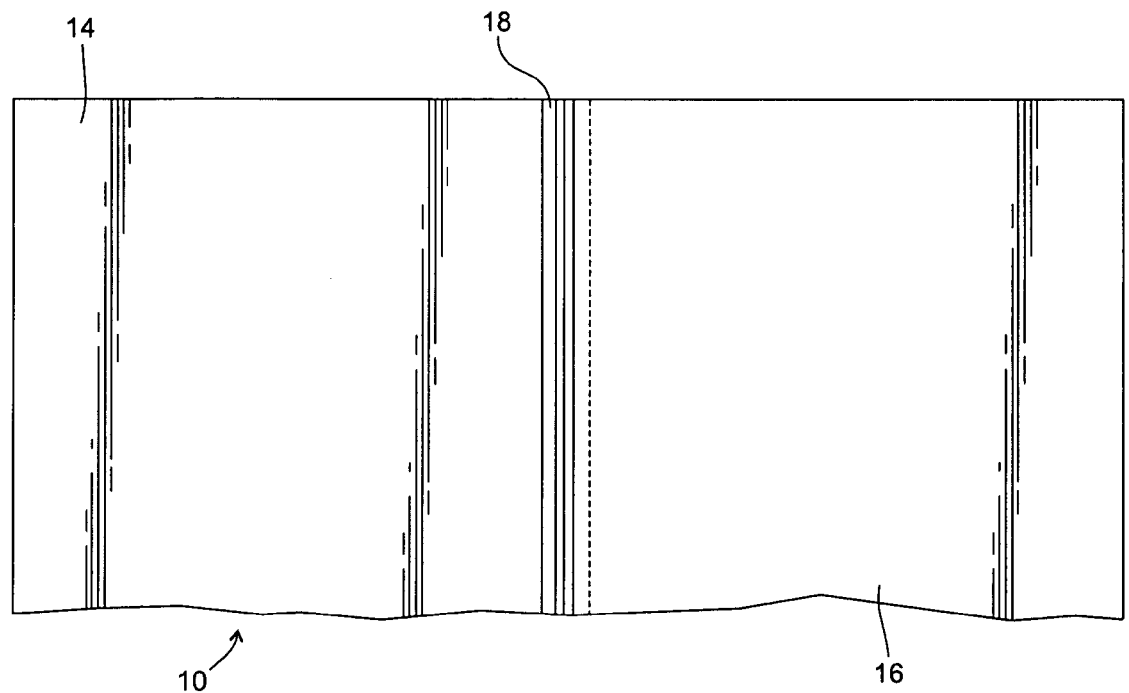
FIG. 8 is a fragmentary top plan view of FIG. 7.
Figure 9:
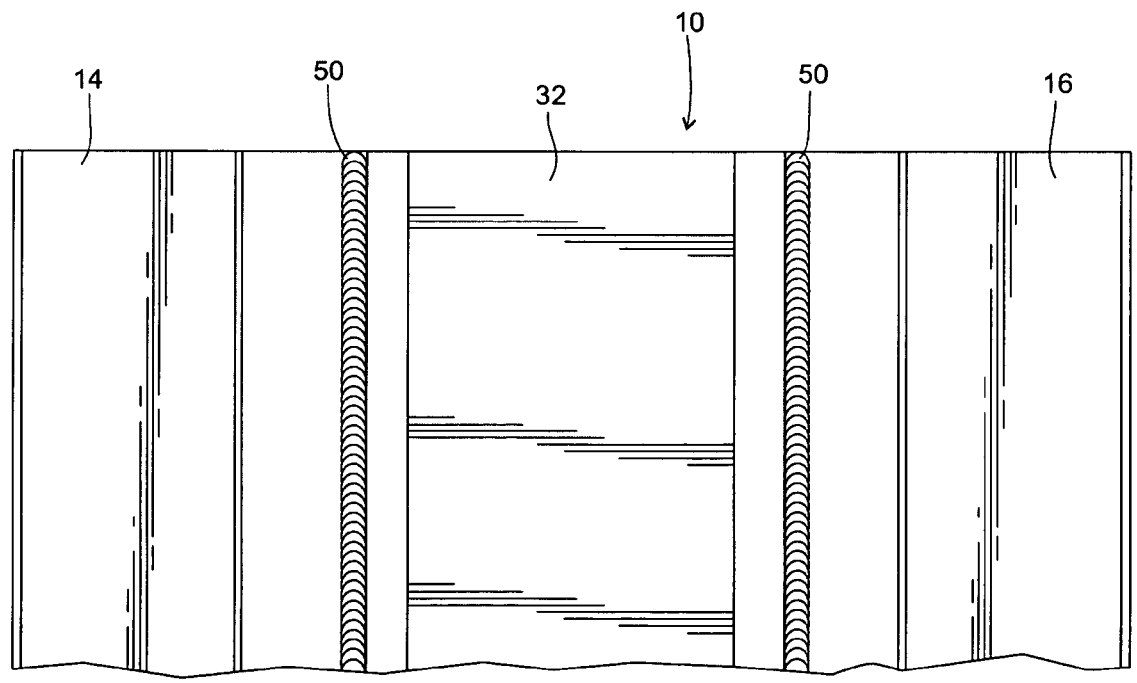
FIG. 9 is a fragmentary bottom plan view of FIG. 7.
Figure 12:
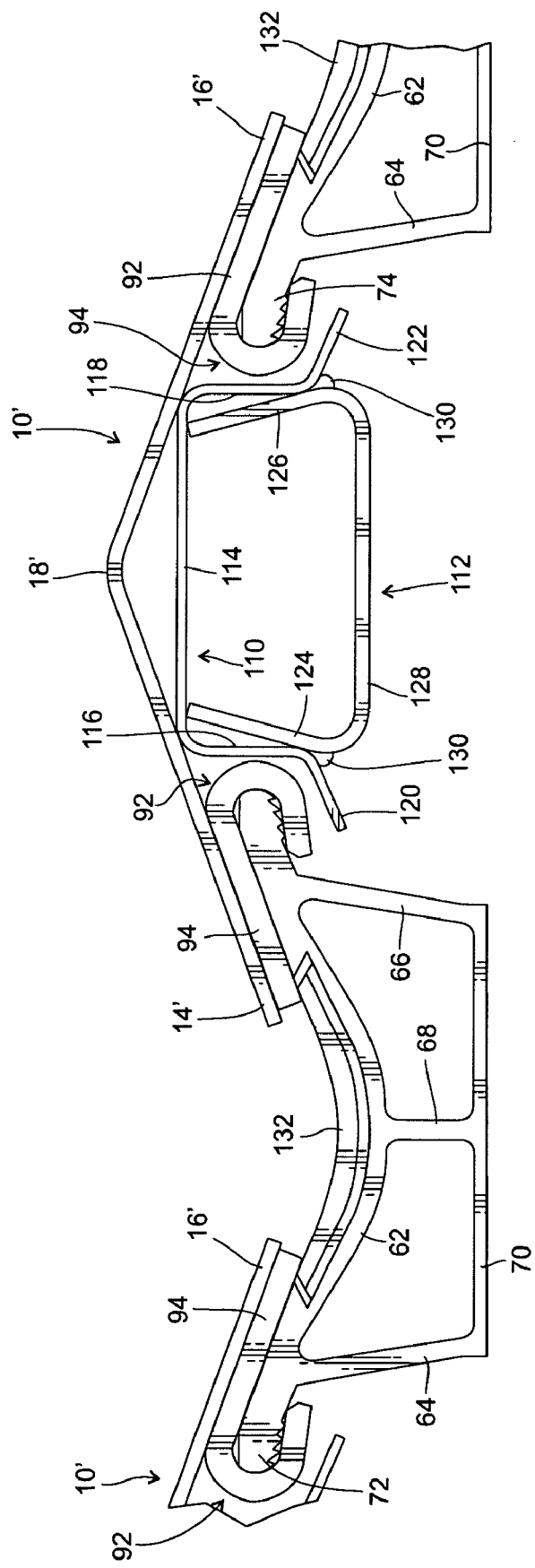
FIG. 12 is a view like FIG. 5 showing a modified construction of the fixed and movable slats.
Figure 13:
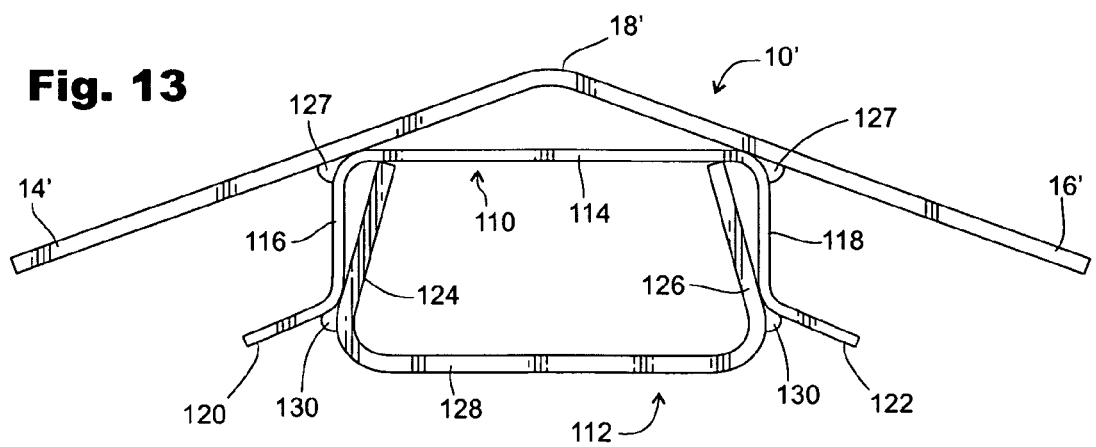
FIG. 13 is a view like FIG. 7, showing the modified construction of the moving conveyor slat.
Figure 14:
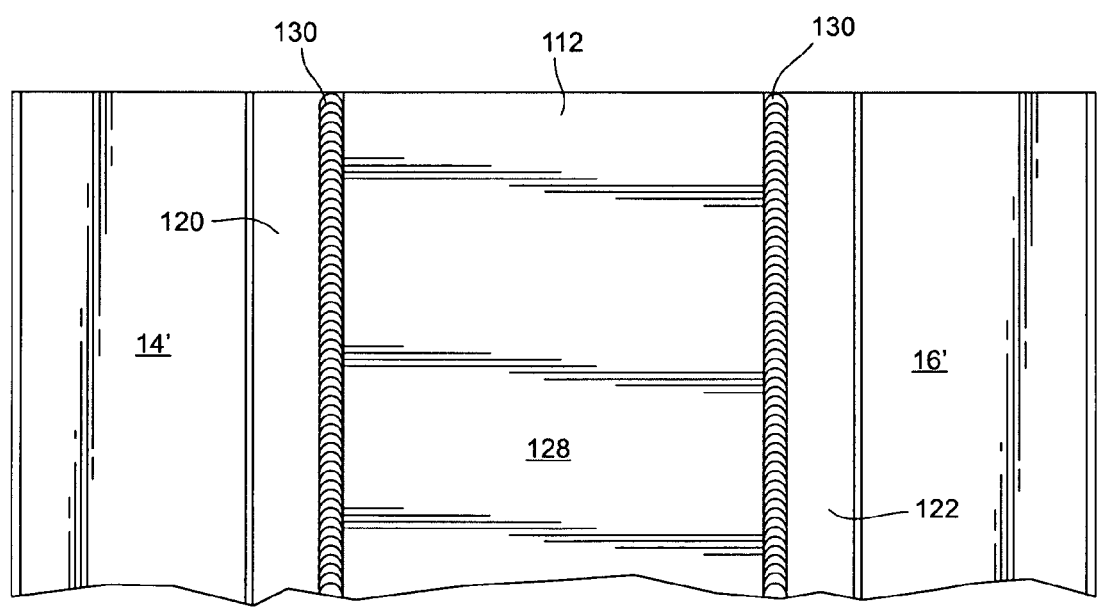
FIG. 14 is a view like FIG. 9, but of the modified embodiment of the moving conveyor slat.
Figure 15:
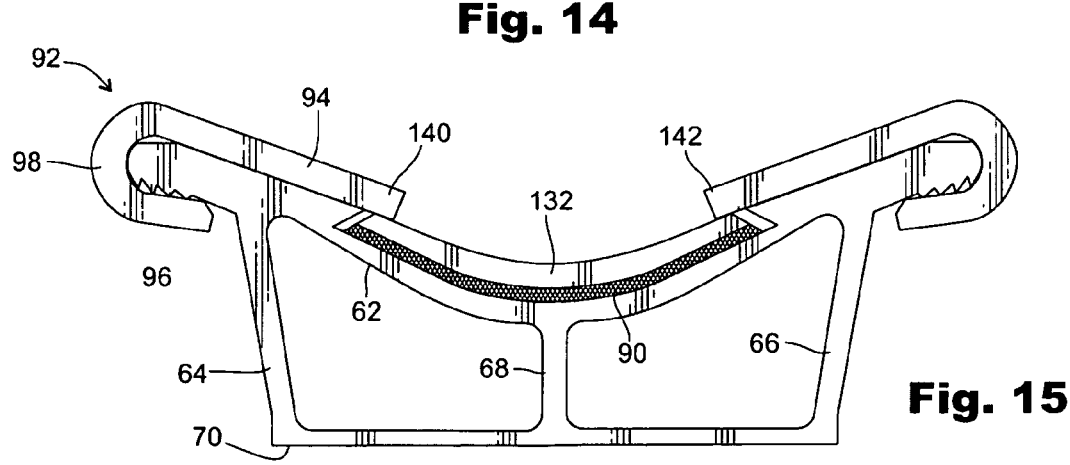
FIG. 15 is a view like FIG. 11, showing the modified construction of the fixed conveyor slat.

In preformed form, the movable slats 10 have a shallow cross sectional shape and are composed of a top wall having side parts 14, 16 that slope outwardly and downwardly from an apex or crown 18. The movable slats 10 include a lower central portion composed of webs 22, 24 and lower flanges 26, 28. As clearly shown by FIGS. 5-7, the members 22, 24, 26, 28 form a downwardly opening channel structure. The sidewalls 22, 24 are webs of the channel structure and the top parts 14, 16 and the lower flanges 26, 28 are the flanges of the channel. As shown by FIGS. 6 and 7, the channel structure 14, 16, 22, 24 opens downwardly and provides a channel space 30. An elongated lower member 32 fits upwardly into the channel space 30. Member 32 has sidewalls 34, 36 and a bottom wall 38. The bottom wall includes a longitudinal center portion 40 that extends upwardly from the bottom wall.

As best shown by FIGS. 6 and 7, the slat 10 and the lower member 32 are extrusions, preferably constructed from an aluminum alloy material. As shown by FIG. 7, the member 32 fits snuggly within the channel 30. The outer surfaces of the walls 34, 36 are contiguous the inwardly directed surfaces of the webs 22, 24. The side parts 14, 16 of the top 10 form acute angles X with the vertical webs 22, 24. The webs 22, 24 form obtuse angles Y with the lower flanges 26, 28. The slat 10 is preferably constructed to include shoulders 42, 44 which extend downwardly and abut with the upper edges 46, 48 of the lower member 32. As shown by FIG. 7, the lower member 32 is positioned in the channel 30, with the upper edges 46, 48 in abutting contact with the shoulders 42, 44. Weld beads 50 are applied to weld the lower member 32 to the slat 10. When the lower member 32 is connected to the slat 10, the webs 22, 24 and the sidewalls 34, 36 form sidewalls of a box beam. The center portion of the top 10 forms a top for the box beam. The lower wall 38 forms a bottom for the box beam.

Figure 4:
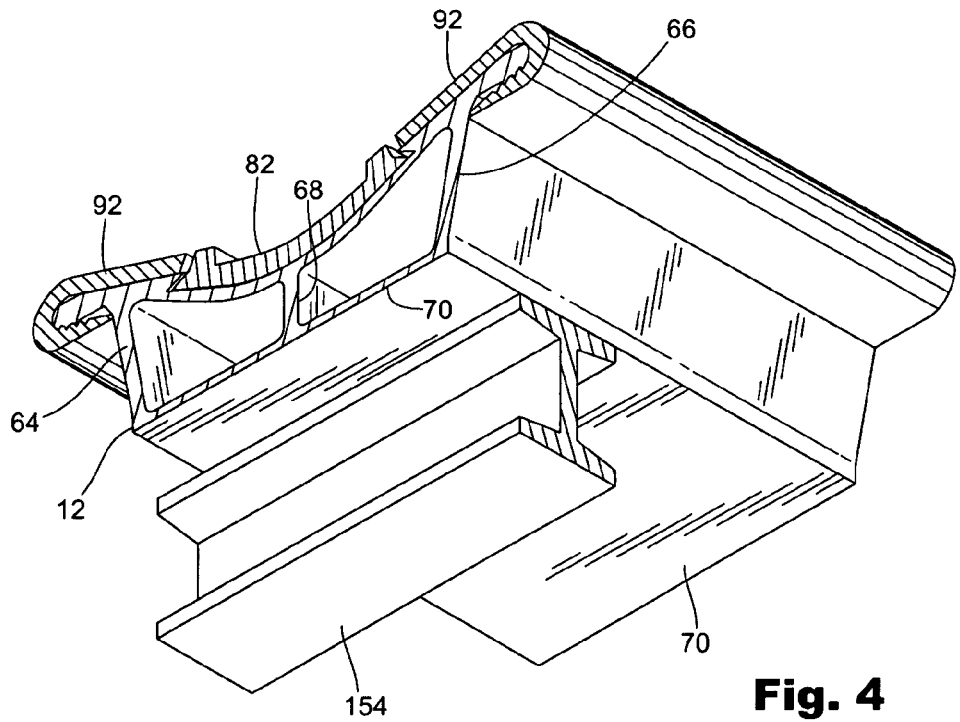
FIG. 4 is a fragmentary pictorial view taken from below and looking upwardly towards the components shown in FIG. 3, in an assembled condition, and showing a portion of a supporting frame member.
Figure 5:
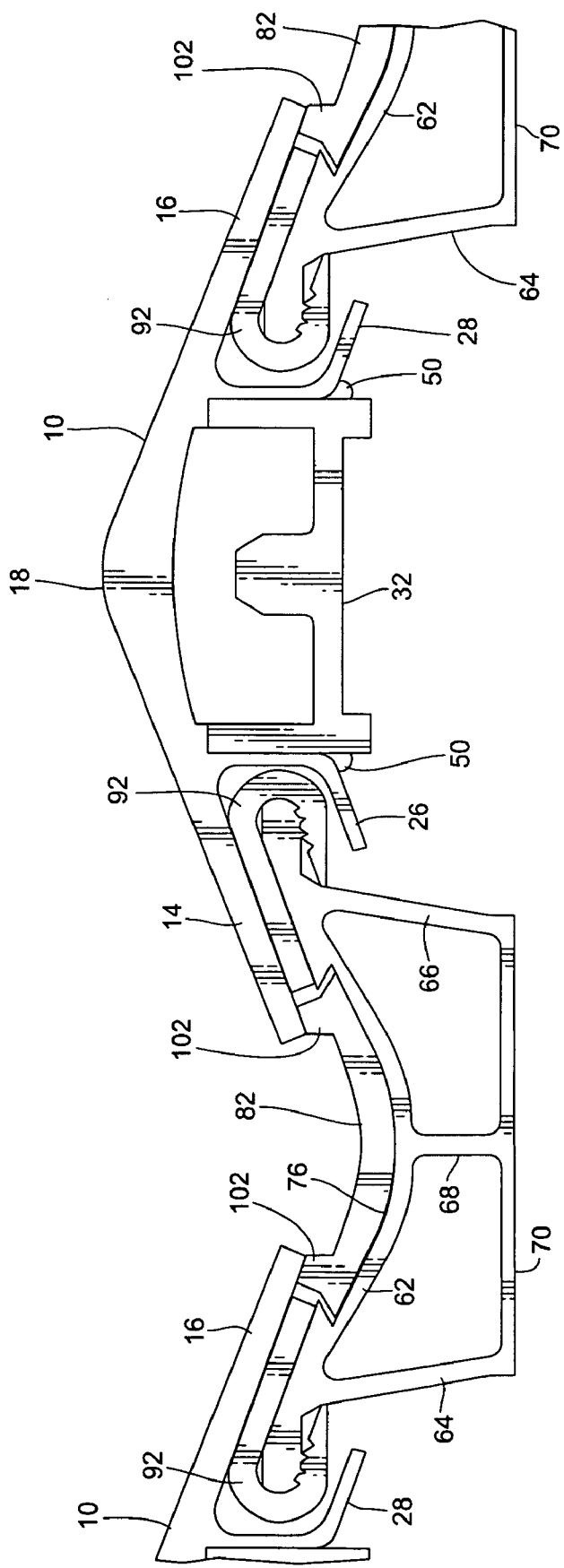
FIG. 5 is an enlarged scale end elevational view of a fragmentary portion of FIG. 1, showing one fixed conveyor slat, one movable conveyor slat and fragmentary portions of a second fixed conveyor slat and a second movable conveyor slat.

Referring to FIGS. 1-5, 10 and 12, the fixed slats 12 also have a central box beam portion 60 formed by a top wall 62, sidewalls 64, 66, a central wall 68 and a bottom wall 70. The sidewalls 64, 66 slope outwardly a few degrees (e.g. about ten degrees) from vertical as they extend upwardly from bottom wall 70. Central wall 68 extends substantially vertically. The top wall 62 of the fixed slats 12 is upwardly concave, giving the fixed slats 12 a shallow V-shape at their tops. The top wall 62 includes opposite side portions or wings 72, 74 that project laterally outwardly from the sidewalls 34, 36. In the embodiment shown by FIGS. 1-5, 10 and 12 the top 62 includes a central channel recess 76 that extends the full length of the slat 12. The side boundaries 78, 80 of the channel 76 converge as they extend upwardly from the bottom of the channel 76. This forms overhanging edges which define a top opening in the channel 76 that is narrower than the bottom of channel 76. A wear strip 82 snuggly fits within the channel 76. It has side edges 84, 86 which are shaped to conform to the channel edges 78, 80. As shown by FIGS. 5, 10 and 11, this results in the wear strip 82 being retained against upward movement out from the channel 76.

Each wear insert 82 is slid endwise into its channel 76 formed in the top of its fixed slat. Then, at one of its ends, the insert 82 is welded to its slat 12. In FIG. 11, a weld bead is designated 90. Preferably, this is the only connection of the insert 82 in the slat 12. Throughout the remaining portion of its length the insert 82 is held in position relative to the slat 12 by the channel edges 78, 80 where they overlap the insert edges 84, 86. In place of a weld bead 90, the connection might be made by one or more rivets or a strong adhesive.

Generally U-shaped bearings 92 are installed on the flanges 72, 74. A single bearing 92 may extend the full length of the slat 12. Or, shorter segments may be positioned end-to-end on the flanges 72, 74. Each bearing 92 has an upper portion 94, a lower portion 96 and a bight portion 98 that interconnects the upper and lower portions 94, 96. As shown by FIG. 5, the bearings 72 hug the flanges 72, 74. The upper portion 94 of each bearing 92 includes an inner edge 100 that is adjacent its side of the channel 76. As shown by FIG. 5, the top 14, 16 of the moving slat 10 has side edge portions that extend laterally outwardly beyond the bearing edges 100. A nook is formed below the projecting edge portions of the slat top 14, 16. Preferably, the insert 82 includes projections 102 that extend upwardly from the side edges of the insert 82, into the nooks. This places a projection 102 outwardly adjacent the edges 100 of the bearings 92. The projections 102 form a protective wall that prevents the conveyed material from entering under the tops 14, 16 of the slats 10 and injuring the edges of the bearings. If the conveyor is going to be used for conveying a material that is not particularly injurious to the bearings 92, the projections 102 may be omitted.

The central box beam section of the conveying slat 10 will carry a considerable amount of load imposed downwardly on the conveying slat 10. Preferably, there is a gap between the slat walls 34, 36 and the bearing bight portions 98. However, if the load on the slats 10 tend to displace the walls 34, 36 laterally outwardly, the walls 34, 36 will be moved into contact with the bight portions 98 of the bearings 92. As a result, the side flanges 72, 74 of the fixed slats 12, and the bearings 92, will function to brace the walls 22, 24 and 34, 36.

The slats 10 may be extrusions wherein the tops 14, 16, the sidewalls 34, 36 and the flanges 38, 40 are all a single member, formed by the extrusion process. The embodiment shown by FIGS. 12-15 includes a composite metal slat 10' formed by a top 14', 16' an intermediate member 110 and a lower member 112. Members 14', 16' and 110 and 112 all extend the full length of the conveyor. Member 110 includes a top wall 114, sidewalls 116, 118 and bottom flanges 120, 122. Member 114 is welded to top 14', 16' by weld beads 114, 115. Sides 116, 118 and flanges 120, 122 perform the function of sides 34, 36 and flanges 38, 40 in the first embodiment. Member 112 may be composed of sidewalls 124, 126 and bottom wall 128. As illustrated, the sidewalls 124, 126 extend upwardly from the bottom wall 128 into the channel space formed by and between sidewalls 116, 118, below top wall 114. Member 112 may be welded to member 110 by weld beads 128, 130.

In the embodiment shown by FIGS. 12-15, the insert 132 does not include the upper projections 102. Rather, the tops 94 of the bearings 92 have edge portions which sit down on upper edge portions of the member 132. See FIG. 15.

Figure 16:
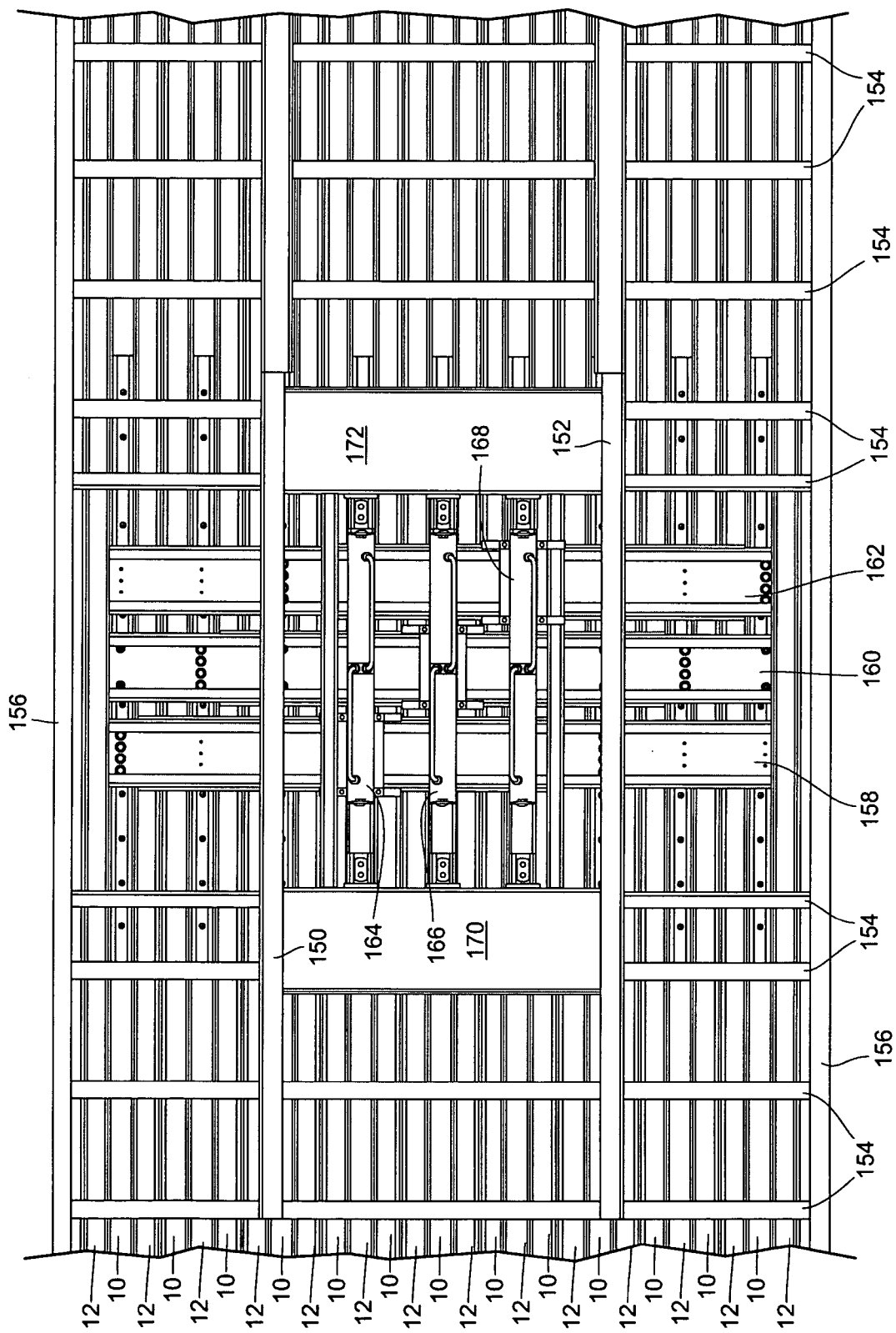
FIG. 16 is a bottom plan view of the conveyor frame, including a window formed in the frame and three transverse drive beams in the window, and three drive units adapted to move the three transverse drive beams back and forth lengthwise of the conveyor.

FIGS. 16 and 17 are bottom plan views of fragmentary portions of an installation frame (e.g. trailer frame), showing longitudinal main frame beams 150, 152, transverse frame beams 154, and outside beams 156. At an appropriate location in the length of the installation frame, there is a window formed between two of the transverse beams 154. Three drive beams 158, 160, 162 are positioned in the window. The drive beam 158 is connected to the movable portion of a first drive unit 164. Drive beam 160 is attached to the movable portion of a second drive unit 166. Drive beam 162 is attached to the movable portion of a third drive unit 168. At their ends, the drive units 164, 166, 168 are attached to mounting frame beams 170, 172. The opposite ends of the mounting frame beams are connected to the longitudinal main frame beams 150, 152 or some other suitable frame member. This is a typical construction and arrangement.

FIG. 17 is a bottom plan view of the installation but with the drive beams 158, 160, 162 and the drive units 164, 166, 168 omitted. This is done so that the bottoms of the fixed and movable slats can be seen in the region of the window in the frame. As previously described, the conveyor is made up of alternating movable and fixed slats 10, 12. Every third movable slat 10 is connected to a common drive beam 158, 160, 162. This connection is done by connecting structure that is shown by FIGS. 18 and 19. At each connection location, a pad 180 is provided on the transverse drive beam for its slat. Referring to FIG. 18, a pedestal 182 is connected to the bottom 128 of member 112, such as by weld beads 184. Pad 180 may be welded to its drive beam 158, 160, 162 and the pedestal 182 is welded to the wall 128 of the lower member 112 of its movable slat 10'. The pedestals 182 include threaded bolt-receiving openings. Bolts 184 project upwardly from the drive beam 158, 160, 162 and thread into the threaded openings. This connects the pedestal 112 and the slat 10' to its transverse drive beam 158, 160, 162.

Referring to FIG. 19, the connections of movable slats 10 to the drive beams 158, 160, 162 is quite similar. Here, however, an additional bar 186 is added. The center member 80 is provided with a plurality of vertically extending threaded openings. Bar 186 is connected to member 32 by bolts 188 that extend through bar 186 and thread into the threaded openings in member 32. Bar 186 is welded to pedestal 182. As before, the pedestal 182 and the slat 10 are connected to the transverse drive beams 158, 160, 162 by bolts 184 that extend upwardly from the drive beam and screw into the threaded openings in the pedestal 182.

Figure 2:
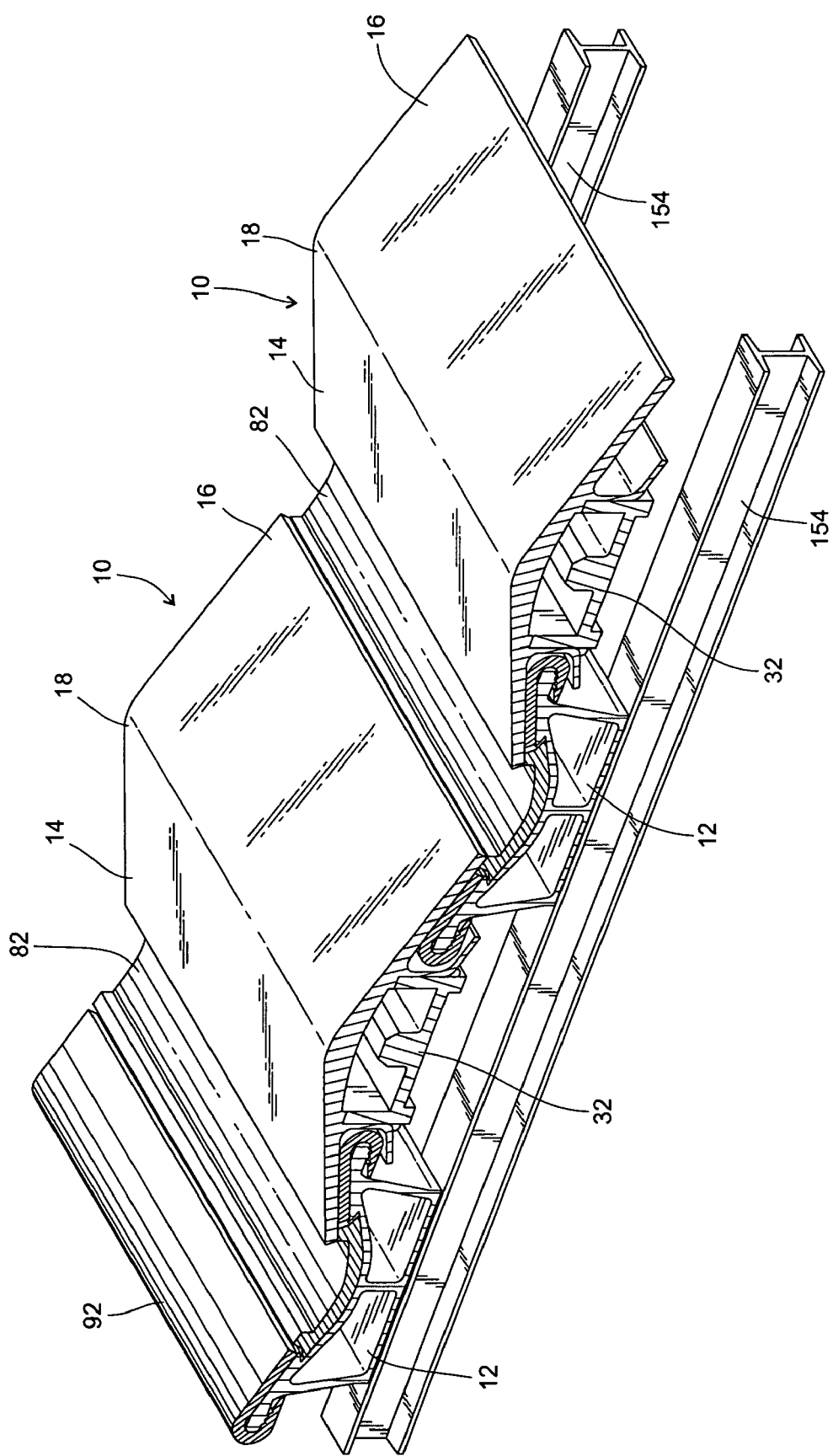
FIG. 2 is fragmentary pictorial view of a portion of the conveyor shown by FIG. 1, taken from above and showing portions of fixed and movable conveyor slats in cross section.
Figure 3:
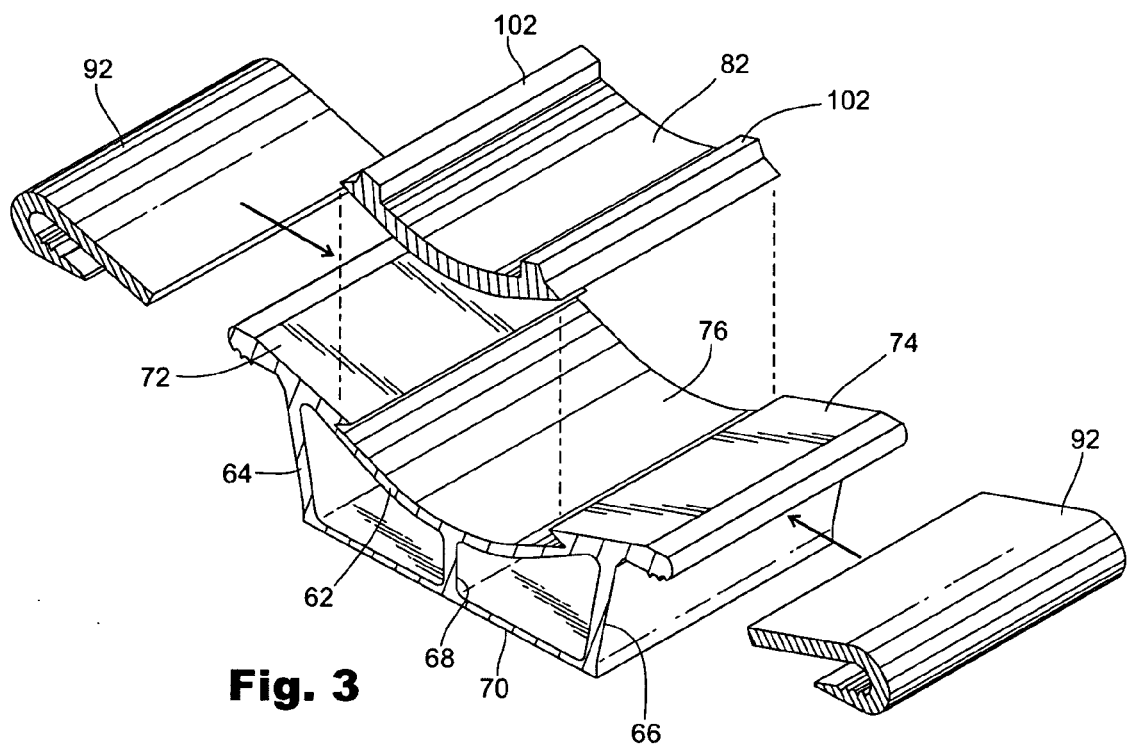
FIG. 3 is an exploded pictorial view of a portion of a fixed conveyor slat and a replaceable center insert for the fixed conveyor slat.

In the embodiment shown by FIG. 2, the slat member 10', the intermediate member 110, the lower member 112 and the pedestal 182 are all preferably constructed of steel. This makes it easy to weld the pedestal 182 to the lower member 112 and weld the lower member 112 to the intermediate member 110 and weld the intermediate 110 to the movable slat 10'.

In the embodiment shown by FIG. 19, the slat 10 and the member 32 are preferably constructed from aluminum. Whereas the bar 186, the pedestal 182 and the bar 180 are constructed from steel. Members 10, 32 can be and are welded together. Members 182 and 186 can be welded together. Bar 180 is welded to its transverse drive beam 158, 160, 162. The construction shown by FIG. 19 allows the steel bar 182 to be bolted to the aluminum member 32, providing a solid connection even though different metals are used.

Figure 1:
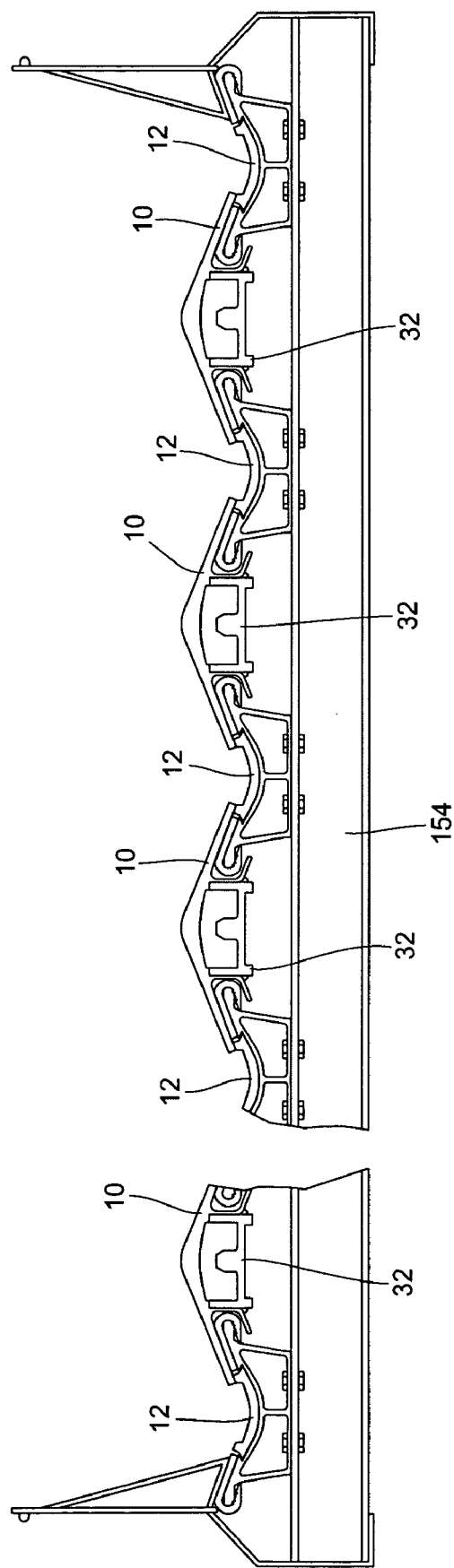
FIG. 1 is a rear end elevational view of a reciprocating slat conveyor that forms the bottom of a material compartment, such view being broken away for the purposes of indicating indeterminate width of the conveyor structure, such conveyor structure including an embodiment of the invention.

As is conventional practice, the fixed slats 12 are connected to the transverse frame beams 154. This is shown by FIGS. 1, 2 and 4. In the region of the window, the fixed slats 12 extend over the transverse drive beams 158, 160, 162 (FIGS. 18 and 19) and bridge between the two transverse beams 154 that are at the front and rear boundaries of the window. The connection of the movable slats 10, 10' to the transverse drive beams 158, 160, 162 provides some support for the slats 10, 10' in the region of the window. However, both the movable slats 10, 10' and the fixed slats 12 are supported by their box beam constructions as they extend over the window. Also, the slats 10, 10' and 12 mutually brace each other. This is because the side parts 14, 14' and 16, 16' of the movable slat 10, 10' bear down on the bearings 92 which are integrated with the fixed slats 12. The channel construction of the side portions of the slats 10, 10', where they engage the bearings 92, stiffens the movable slats 10, 10' and further integrates the movable slats 10, 10' with the fixed slats 12.

Figure 20:
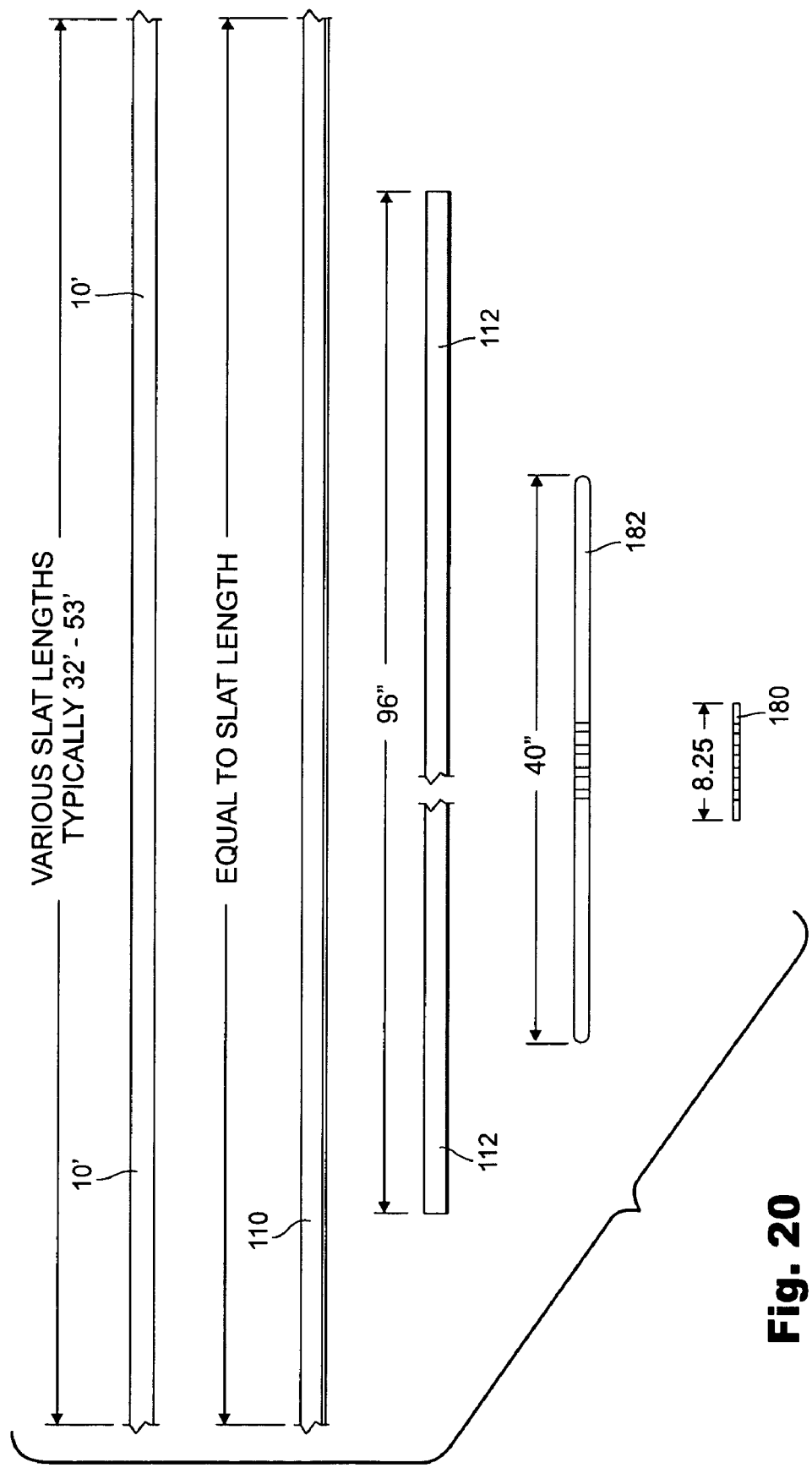
FIG. 20 is a side elevational view of the components of the conveyor slat shown by FIGS. 12-14.

Referring to FIG. 20, the top member of the moving slat 10' and the intermediate member 110 both extend the full length of the conveyor which, as indicated, could be typically 32 ft-53 ft. The lower member 112 may typically extend 96 in or 8 ft. The pedestal 182 may typically extend about 40 in. The pad 180 may typically extend about 8¼ in. These dimensions are given by way of typical example and, of course, can vary from the examples.

Pedestal 182 is provided with bolt-receiving openings in its midsection and these openings are aligned with bolt-receiving openings in the pad 180. As shown in FIG. 20, the pedestal 182 has end portions that extend outwardly from the ends of the pad 180. Lower member 112 has end portions that extend outwardly from the pedestal 182. Members 10', 110 have end portions that extend outwardly from the ends of lower member 112. The pedestal 182 is firmly connected to the member 112. The member 112 is firmly connected to the member 110. Member 110 is firmly connected to the member 10'. As previously described, these connections may be made by weld beads that extend lengthwise of the respective members.

Figure 21:
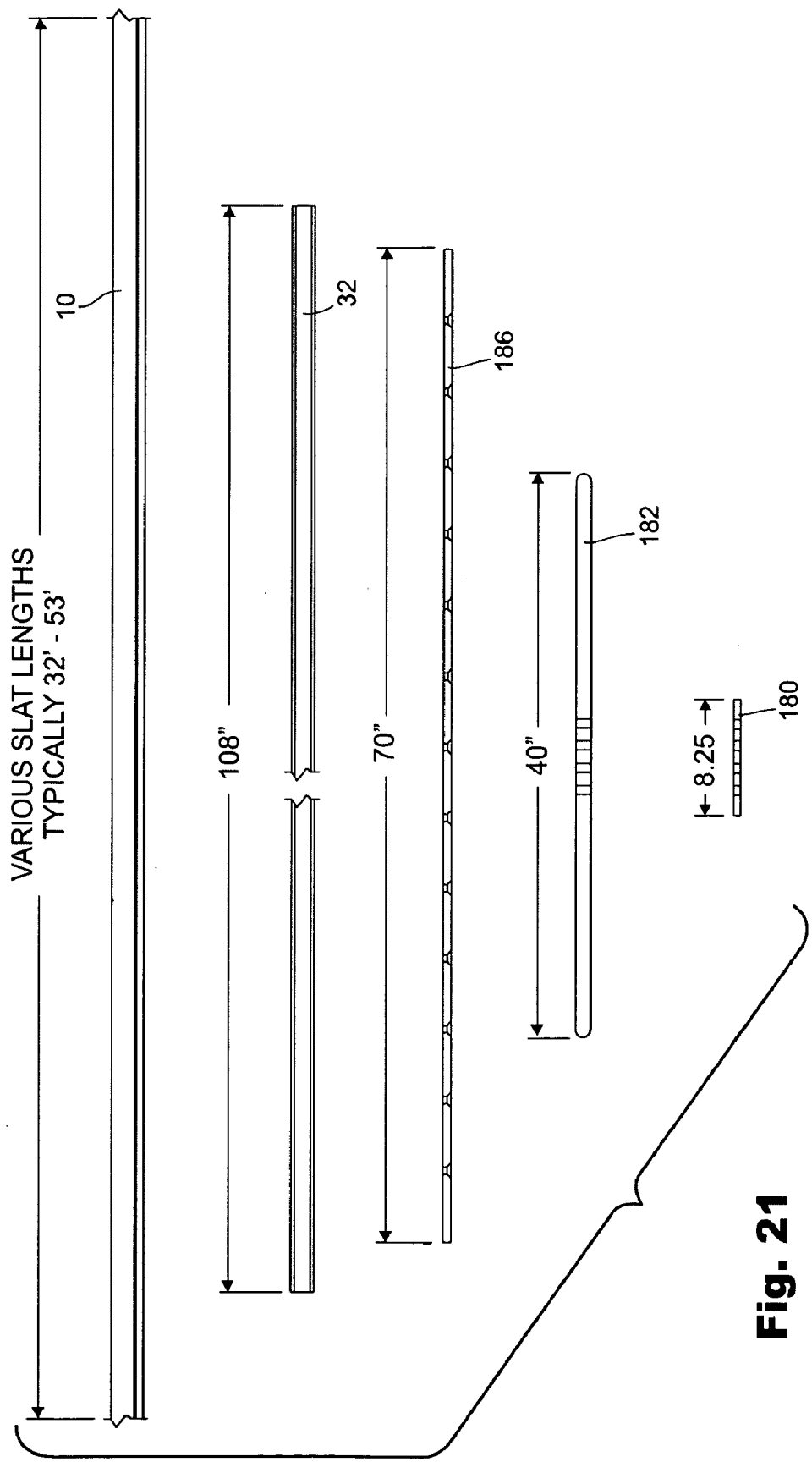
FIG. 21 is a view like FIG. 20, but of the components of the conveyor slat shown by FIGS. 5-7.

Referring to FIG. 21, slat 10 may typically measure about 32 ft to about 53 ft. This is substantially the full length of the conveyor floor. Member 32 may typically measure about 9 ft or 108 in. Member 186 may typically measure about 70 in. Pedestal 182 may typically measure about 40 in. Pad 180 may typically measure about 8½ in. Member 182 has opposite end portions which extend endwise outwardly from the ends of the member 180, in the manner illustrated in FIG. 21. Similarly, member 186 has opposite end portions which extend endwise outwardly from the ends of member 182. Member 32 has opposite ends which extend endwise outwardly from the ends of member 186. Member 10 has opposite end portions which extend endwise outwardly from the ends of member 32.

FIG. 19 illustrates a typical relative positioning of the members 10, 32, 186, 182, 180 when they are connected together. As previously stated, member 32 is welded to member 10. Member 186 is connected to member 32 by means of bolts. FIG. 21 shows a series of bolt holes formed in the member 186. Member 182 includes bolt-receiving openings which align with bolt-receiving openings in the member 180. Bolts 184 extend upwardly through the openings in members 180, 182 for connecting the members 180, 182 together. Member 180 is welded to its cross drive 158, 160, 162 and member 182 is welded to member 186. Members 10, 32 are welded together. A series of bolts extend through the openings then members 186 thread into threaded openings in member 32. This serves as a way of connecting the aluminum members 10, 32 to the steel members 186, 182, 180.

The illustrated embodiments are only examples of the present invention and, therefore, are non-limitive. It is to be understood that many changes in the particular structure, materials and features of the invention may be made without departing from the spirit and scope of the invention. Therefore, it is our intention that our patent rights not be limited by the particular embodiments illustrated and described herein, but rather are to be determined by the claims which follow, interpreted in accordance to the established rules of patent claim interpretation.

What is claimed is:

1. An extruded conveyor slat for a reciprocating slat conveyor, comprising:
    an elongated slat body having a top wall, spaced apart webs depending from the top wall, and lower flanges projecting laterally outwardly from each web;
    said top wall having opposite side parts which project laterally outwardly beyond each web;
    said side parts of the top wall sloping downwardly as they extend outwardly beyond each web;
    said lower flanges sloping downwardly as they extend outwardly beyond said web; and wherein
    said side part, web, and lower flange on opposite sides of said extruded conveyor slat each forming a laterally outwardly opening side channel for receiving a bearing.

2. The conveyor slat of claim 1, wherein the top wall has a convex crown.

3. The conveyor slat of claim 1, wherein each web forms an acute angle with the side part of the top wall on its side of the slat body, and each web forms an obtuse angle with the lower flange on its side of the slat body.

4. The conveyor slat of claim 1, wherein the top wall is generally flat and is thicker than the side parts of the top wall.

* * * * *